United States Patent [19]

Iwatsuki et al.

[11] Patent Number: 5,643,691
[45] Date of Patent: Jul. 1, 1997

[54] GAS DISCHARGING DEVICE FOR BATTERIES FOR USE ON ELECTRIC VEHICLE

[75] Inventors: Syuichiro Iwatsuki; Kei Oshida; Masayoshi Okamoto, all of Wako, Japan

[73] Assignee: Honda Giken Kogyo Kabushiki Kaisha, Tokyo, Japan

[21] Appl. No.: 395,897

[22] Filed: Feb. 28, 1995

[30] Foreign Application Priority Data

Mar. 1, 1994 [JP] Japan .................................. 6-031630

[51] Int. Cl.$^6$ ...................................................... H01M 2/12
[52] U.S. Cl. ............................. 429/54; 429/61; 429/88
[58] Field of Search ................................. 429/53, 54, 61, 429/87, 88

[56] References Cited

U.S. PATENT DOCUMENTS

| | | | |
|---|---|---|---|
| 932,087 | 8/1909 | Apple | 429/88 X |
| 1,324,797 | 12/1919 | Chubb | 429/88 X |
| 3,287,173 | 11/1966 | Cox et al. | 429/87 |
| 4,424,263 | 1/1984 | Howell et al. | 429/88 |
| 4,556,612 | 12/1985 | Thibault et al. | 429/54 |
| 5,298,344 | 3/1994 | Stocchiero | 429/53 |

FOREIGN PATENT DOCUMENTS

| | | | |
|---|---|---|---|
| 3018372 | 11/1991 | Germany | 429/53 |
| 134279 | 10/1989 | Japan . | |

OTHER PUBLICATIONS

English language translation of a protion of JP 1–34279 Oct. 18, 1989.

Primary Examiner—Stephen Kalafut
Attorney, Agent, or Firm—Lyon & Lyon LLP

[57] ABSTRACT

A pair of discharge pipes interconnect outlet ports of a plurality of batteries such that the first discharge pipe interconnects the outlet ports of some of the batteries and the second discharge pipe interconnects the outlet ports of the remaining batteries. The discharge pipes have rear ends connected respectively to atmospheric discharge units and other ends connected by joint pipes. Since the rear ends of the discharge pipes are connected to the atmospheric discharge units, even if one of the discharge pipes is closed or blocked for some reason, a gas emitted from the batteries is discharged from the other discharge pipes and hence is prevented from being trapped in the batteries. Additional pairs of discharge pipes a employed in the same manner for an additional plurality of batteries. The atmospheric discharge units include a backfire check member or valve and/or baffles for inhibiting ignition of the gas emitted from the batteries.

54 Claims, 9 Drawing Sheets

GAS DISCHARGING DEVICE FOR BATTERIES FOR USE ON ELECTRIC VEHICLE

BACKGROUND OF THE INVENTION

1. Field of the Invention

The present invention relates to a device for discharging a gas from batteries for use on an electric vehicle.

2. Description of the Related Art

When batteries carried on electric vehicles are charged or discharged, they emit a hydrogen gas because the liquid electrolyte is electrolyzed. For safety precautions against accidental ignition of the emitted hydrogen gas, it is necessary to safely discharge the emitted hydrogen gas of its own accord or forcibly from the batteries.

In efforts to meet such a requirement, there has been proposed a device for discharging a gas from batteries on an electric vehicle as disclosed in Japanese utility model publication No. 1-34279, for example.

The proposed device has a pipe doubling as a solution supply pipe for supplying a battery solution or liquid electrolyte to the batteries and a gas discharge pipe for discharging a gas from the batteries. Specifically, solution supply chambers disposed above the respective batteries are connected in series with each other by the pipe which has an end vented to the atmosphere. The gas generated by the batteries is discharged from the batteries through the solution supply chambers and the pipe into the atmosphere.

One problem of the conventional device is that in the event of clogging of the pipe or a certain pipe failure, the gas is trapped in the pipe upstream of the clogged region of the pipe and remains undischarged from the corresponding batteries. The pipe is generally in the form of a soft hose such as a hose of synthetic resin or rubber, and hence can easily be clogged as by being flattened under pressure.

SUMMARY OF THE INVENTION

It is a general object of the present invention to provide a gas discharging device for discharging a gas from batteries through discharge pipes, the gas discharging device being capable of discharging a gas upstream of any clogged or troubled region of the discharge pipes.

Another object of the present invention is to provide a gas discharging device for discharging a gas from batteries on an electric vehicle, the gas discharging device having discharge pipes which are prevented from being flattened when a lid is placed over the batteries.

Still another object of the present invention is to provide a gas discharging device for discharging a gas from batteries on an electric vehicle, the gas discharging device being capable of discharging the gas in a uniform concentration into the atmosphere.

Yet still another object of the present invention is to provide a gas discharging device for discharging a gas from batteries on an electric vehicle, the gas discharging device being capable of easily and reliably extinguishing flames even when the gas discharged from the batteries is accidentally ignited.

According to the present invention, there is provided a gas discharging device for discharging a gas from batteries for use on an electric vehicle, comprising a battery box, a plurality of batteries housed in the battery box, the batteries having respective outlet ports for emitting a gas therefrom, at least one discharge pipe interconnecting the outlet ports in series with each other, and at least a pair of atmospheric discharge units connected respectively to opposite ends of the discharge pipe for discharging a gas from the discharge pipe into the atmosphere.

The at least one discharge pipe comprises a first discharge pipe and a second discharge pipe, the first discharge pipe interconnecting the outlet ports of selected batteries in series with each other, and the second discharge pipe interconnecting the outlet ports of remaining batteries in series with each other, the atmospheric discharge units comprising atmospheric discharge units connected respectively to opposite ends of the first and second discharge pipes.

At least one of the atmospheric discharge units comprises a case connected to the discharge pipe, a case cover mounted on the case, and gas dispersing means disposed between the case and the case cover for dispersing the gas emitted by the batteries and introduced from the discharge pipe. The gas dispersing means comprises a gas dispersion chamber defined between the case and the case cover and coupled to the discharge pipe, the atmospheric discharge unit further comprising a backfire check member disposed in the gas dispersion chamber.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 15A is an enlarged fragmentary cross-sectional view of an atmospheric discharge unit according to an eighth embodiment of the present invention; and FIG. 15B is an enlarged fragmentary cross-sectional view showing the manner in which a valve of the atmospheric discharge unit shown in FIG. 15A is open.

DETAILED DESCRIPTION OF THE PREFERRED EMBODIMENTS

The principles of the present invention are particularly useful when embodied in a gas discharging device for discharging a gas from batteries for use on an electric vehicle. The terms "front", "rear", "left", "right", and other similar directional expressions will be used herein below with respect to such an electric vehicle as viewed by the driver thereof.

A gas discharging device according to the present invention will be described below with reference to FIGS. 1 through 5.

Figure 1:
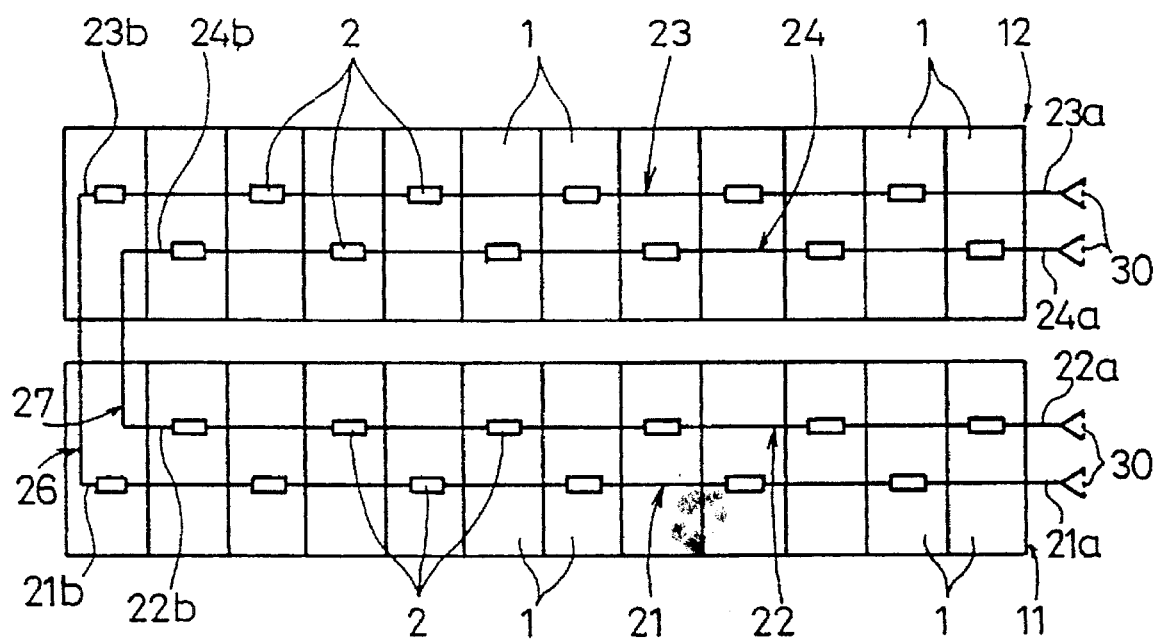
FIG. 1 is a schematic view of a gas discharge passage system according to the present invention.

FIG. 1 schematically shows a gas discharge passage system according to the present invention, which is incorporated in the gas discharging device.

As shown in FIG. 1, a plurality of batteries 1 are arranged in two rows or groups, i.e., a left battery group 11 and a right battery group 12, which are disposed parallel to each other and each composed of 12 batteries.

Each of the batteries 1 of the left battery groups 11 has an outlet port 2. The outlet ports 2 of alternate batteries 1 of the left battery group 11 are connected in series with each other by a first discharge pipe 21, and the outlet ports 2 of the remaining batteries 1 of the left battery group 11 are connected in series with each other by a second discharge pipe 22.

Similarly, each of the batteries 1 of the right battery groups 12 has an outlet port 2. The outlet ports 2 of alternate batteries 1 of the right battery group 12 are connected in series with each other by a third discharge pipe 23, and the outlet ports 2 of the remaining batteries 1 of the right battery group 12 are connected in series with each other by a fourth discharge pipe 24.

The first through fourth discharge pipes 21~24 have respective rear ends 21a~24a connected respectively to atmospheric discharge units 30. The first and third discharge pipes 21, 23 have respective front ends 21b, 23b connected to each other by a joint pipe 26, and the second and fourth discharge pipes 22, 24 have respective front ends 22b, 24b connected to each other by a joint pipe 27.

Figure 2:
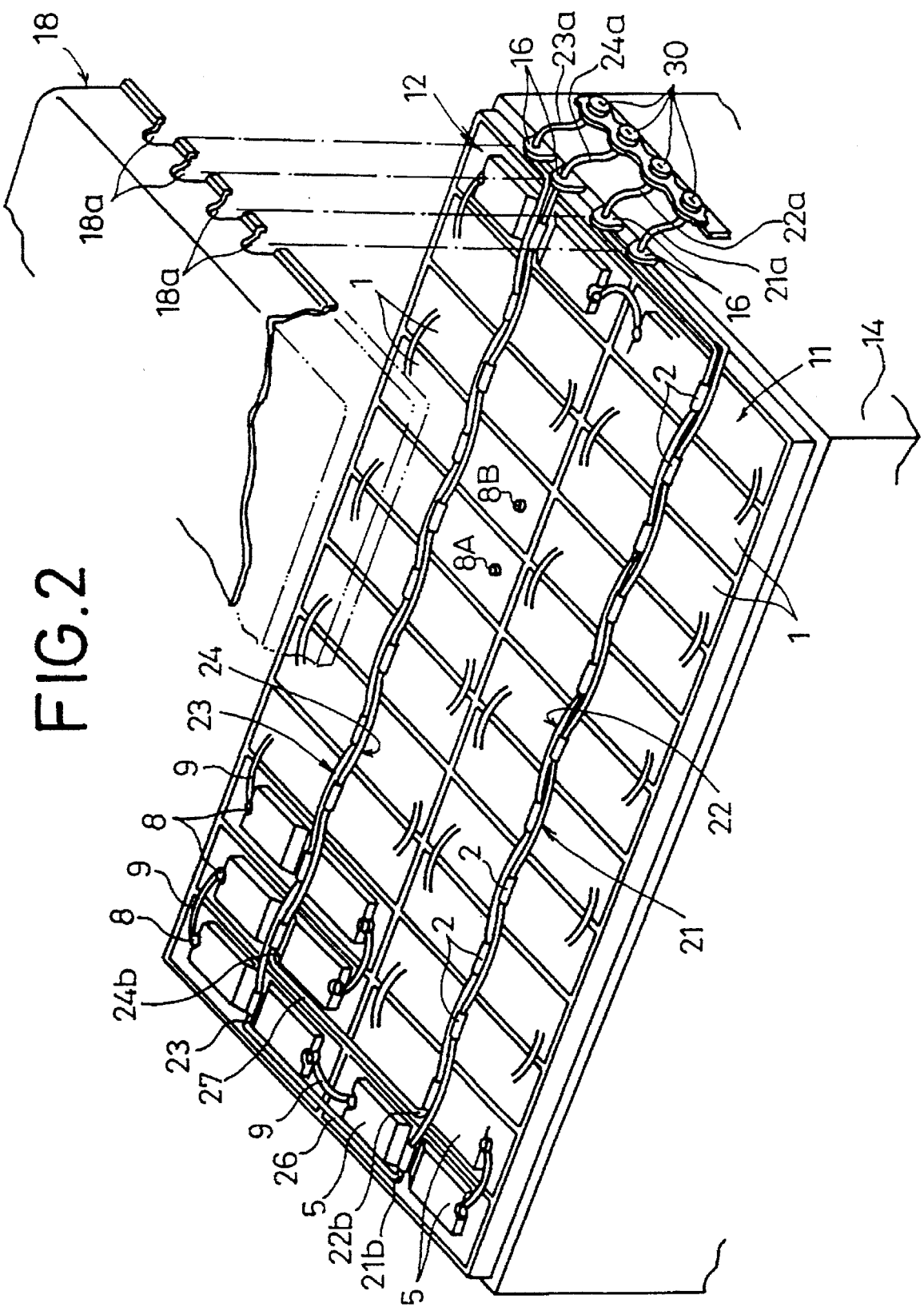
FIG. 2 is a fragmentary perspective view of a gas discharging device according to the present invention.

FIG. 2 shows the gas discharging device in perspective, and also illustrates a specific arrangement in which the batteries 1 and the discharge pipes 21~24 are interconnected.

The battery groups 11, 12 are housed in a bottomed battery box 14. The outlet port 2 of each of the batteries 1 is positioned substantially centrally on its upper surface. Each battery 1 has a pair of heads 5 on the upper surface thereof one on each side of the outlet port 2. The heads 5 of some batteries 1 are omitted from illustration. In the left battery group 11, the first discharge pipe 21 is connected to the even-numbered batteries 1 as counted from the rear end of the left battery group 11, and the second discharge pipe 22 is connected to the odd-numbered batteries 1 as counted from the rear end of the left battery group 11. In the right battery group 12, the third discharge pipe 23 is connected to the even-numbered batteries 1 as counted from the rear end of the right battery group 12, and the fourth discharge pipe 24 is connected to the odd-numbered batteries 1 as counted from the rear end of the right battery group 12.

The rear ends 21a~24a of the discharge pipes 21~24 are supported by respective upstanding support plates 16 which are mounted on an upper edge of the battery box 14 and have respective support holes through which the respective rear ends 21a~24a extend. The atmospheric discharge units 30 are connected to the rear ends 21a~24a that extend from the support plates 16.

The discharge pipes 21~24 and the joint pipes 26, 27 are in the form of flexible hoses made of rubber or the like.

The upper end of the battery box 14 where the discharge pipes 21~24 and the joint pipes 26, 27, and the heads 5 are exposed is covered with a lid 18 having vertical side walls. The rear side wall of the lid 18 has recesses 18a positioned to receive the support plates 16, respectively. When the lid 18 is placed over the upper end of the battery box 14, the support plates 16 are fitted in the recesses 18a, so that the rear ends 21a~24a of the discharge pipes 21~24 will not be crushed by the rear side wall of the lid 18.

The discharge pipes 21~24 and the joint pipes 26, 27 are positioned lower than the upper surfaces of the heads 5. Therefore, the discharge pipes 21~24 and the joint pipes 26, 27 are prevented from being engaged and flattened by the lid 18 when the lid 18 is placed over the upper end of the battery box 14.

Each of the batteries 1 has a pair of terminals 8 projecting upwardly from the upper surface thereof and positioned near the opposite ends, respectively, thereof. The terminals 8 of some batteries 1 are omitted from illustration. These terminals 8 are electrically connected in series with each other by connector lines 9. The terminals 8 include terminals 8A, 8B which are electrically connected to a breaker box (not shown) mounted in the lid 18.

Figure 3:
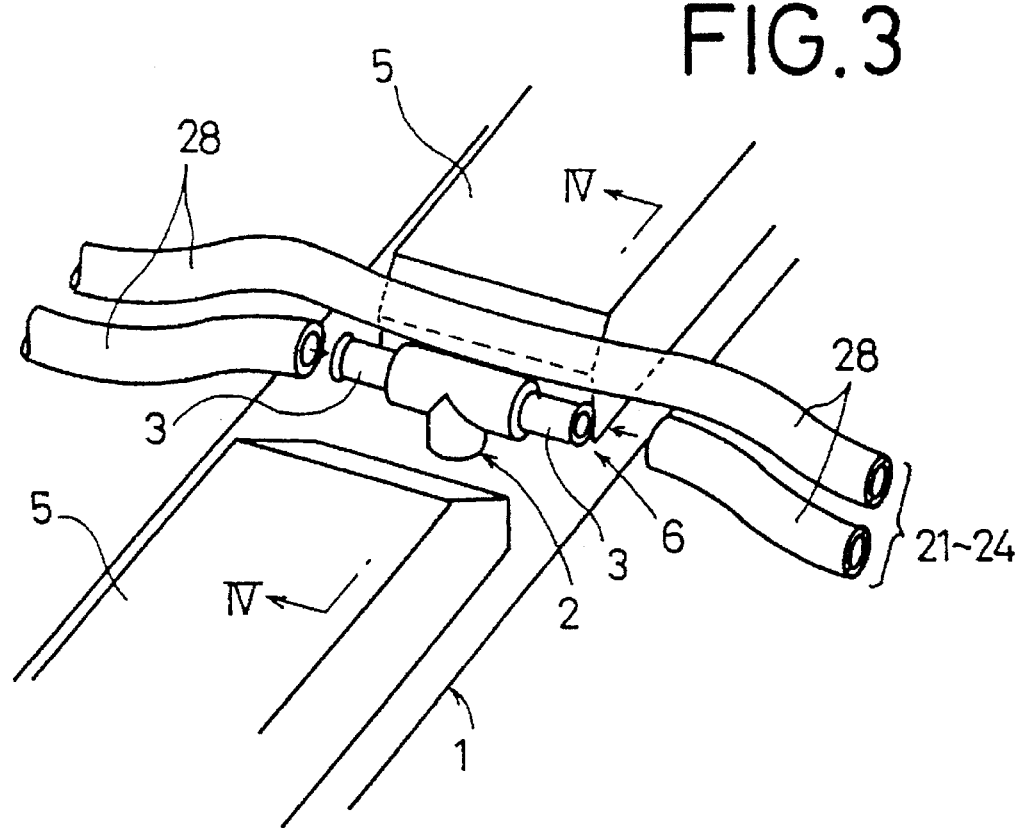
FIG. 3 is an enlarged fragmentary perspective view of an outlet port of the gas discharging device shown in FIG. 2.

FIG. 3 shows the outlet port 2 of each of the batteries 1 and associated parts including the discharge pipes 21~24 connected thereto. As shown in FIG. 3, the outlet port 2 comprises a T-shaped joint having a pair of hose joints 3 extending toward adjacent batteries 1, and the ends of the discharge pipes 21~24 are fitted over the hose joints 3.

Each of the discharge pipes 21~24 comprises a plurality of separate hoses 28 (see also FIG. 2) each having a length which is substantially the same as the distance between the hose joints 3 of alternate batteries 1. Since the hoses 28 have the same length, their dimensions can easily be controlled and they can be mass-produced in a relatively short period of time. Furthermore, inasmuch as the hoses 28 are available in only one length, it is not necessary to select any particular one of the hoses 28 when connecting two hose joints 3, and the hose joints 3 can easily be connected in a relatively short period of time.

Figure 4:
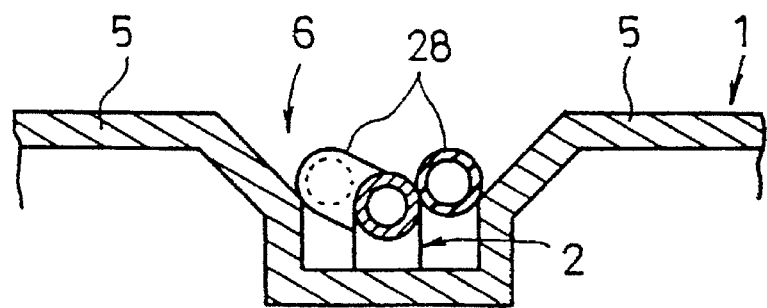
FIG. 4 is a cross-sectional view taken along line IV—IV of FIG. 3.

As shown in FIG. 4, the heads 5 on the upper surface of each of the batteries 1 jointly define a cavity 6 therebetween in which the outlet port 2 is positioned. The separate hose 28 which runs across each of the batteries 1 extends through the cavity 6. Since the separate hoses 28 are positioned lower than the upper surfaces of the heads 5, the separate hoses 28 are prevented from being engaged and flattened by the lid 18 (see FIG. 2) when the lid 18 is placed over the upper end of the battery box 14.

Figure 5:
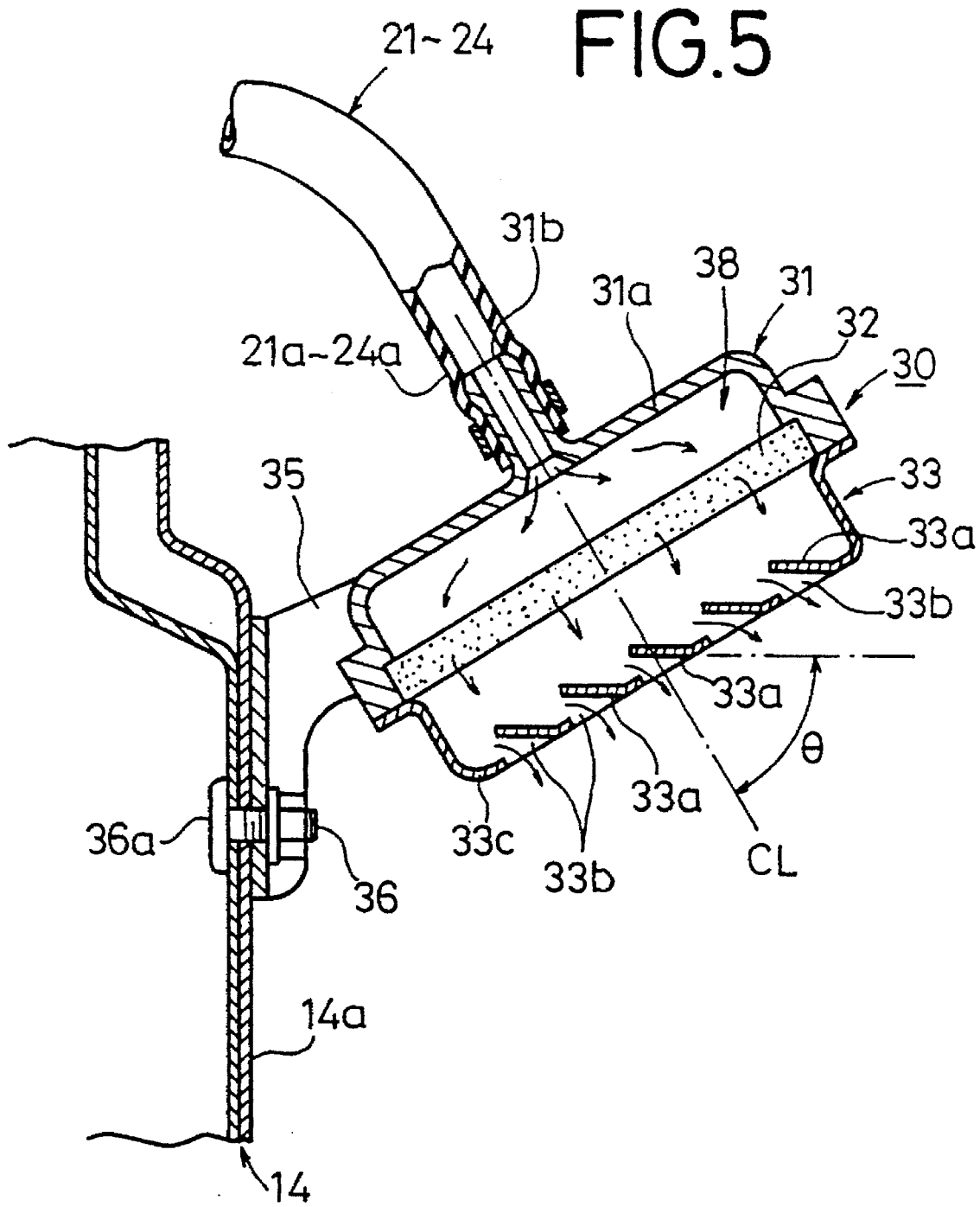
FIG. 5 is an enlarged fragmentary cross-sectional view of an atmospheric discharge unit according to a first embodiment of the present invention.

FIG. 5 shows in enlarged fragmentary cross section an atmospheric discharge unit according to a first embodiment of the present invention. The atmospheric discharge unit, generally denoted at 30, comprises a case 31, a backfire check member (normally referred to as an "explosion-proof filter") 32, and a case cover 33.

The case 31 is positioned rearwardly of the battery box 14 and tilted downwardly in a rearward direction. The case 31 is supported on a support 35 which is fastened to a rear side panel 14a of the battery box 14 by a bolt 36. The bolt 36 has its shank pointed outwardly of the battery box 14. That is, the bolt 36 has a flat head 36a positioned within the battery box 14 and welded to the rear side wall 14a, and the shank projects rearwardly through the rear side wall 14a out of the battery box 14. Therefore, the batteries 1 in the battery box 14 are prevented from being damaged by the tip end of the shank of the bolt 36.

The case 31 has a bottom 31a with an integral gas inlet nozzle 31b, and a rear opening closed by the backfire check member 32. The backfire check member 32 has an outer surface covered with the case cover 33 which is joined at its peripheral edge to the peripheral edge of the case 31 around the backfire check member 32. Each one of the rear ends 21a–24a of the discharge pipes 21–24 is connected to the gas inlet nozzle 31b of a separate discharge unit 30.

The backfire check member 32 serves to prevent a backfire from entering the batteries 1 even when a fire approaches the opening of the case cover 33. The backfire check member 32 is in the form of a disk made of a porous material such as a fired inorganic substance of alumina or the like. The backfire check member 32 is water-repellent so that it will not be made impermeable to air by deposited water or frozen water thereon.

A gas dispersion chamber 38 is defined between the bottom 31a of the case 31 and the backfire check member 32 for dispersing a gas from the gas inlet nozzle 31b in a substantially uniform concentration into the entire surface of the backfire check member 32.

The case cover 33 has a projecting side wall joined to an end wall spaced away from the backfire check member 32 and the end wall has a plurality of gas guide slats 33a defining a plurality of gas discharge slits 33b therebetween. The case cover 33 also has a water drain hole 33c defined in a lowermost end of the end wall. Each of the gas guide slats 33a is tilted at an angle θ of 60°, for example, with respect to a central axis CL of the atmospheric discharge unit 30, and lies substantially horizontally with respect to the electric vehicle, which is denoted at 41 in FIG. 8. Accordingly, no water will be trapped in the atmospheric discharge unit 30, and any gas from the gas inlet nozzle 31b is allowed to be discharged smoothly without being blocked by any water which would otherwise be trapped in the atmospheric discharge unit 30. The gas guide slats 33a are effective to block a fire against entry into the atmospheric discharge unit 30.

Operation of the gas discharging device of the above structure will be described below with reference to FIG. 1.

When charged or discharged, each of the batteries 1 generates a hydrogen gas because the liquid electrolyte is electrolyzed. The generated hydrogen gas is delivered under its own pressure from the discharge ports 2 through the discharge pipes 21–24 and the joint pipes 26, 27 into the atmospheric discharge units 30 connected to the respective discharge pipes 21–24.

In each of the atmospheric discharge units 30, the gas introduced from the gas inlet nozzle 31b is dispersed at a substantially uniform concentration in the gas dispersion chamber 38, ejected from the minute pores of the backfire check member 32, further dispersed by the gas guide slats 33a, and discharged of its own accord into the atmosphere through the gas discharge slits 33b.

In FIG. 1, when the first discharge pipe 21 is closed as by clogging or the like somewhere along its length, the gas upstream of the closed region of the first discharge pipe 21 flows therefrom through the front end 21b, the joint pipe 26, the third discharge pipe 23, the rear end 23a thereof, and the atmospheric discharge unit 30, where the gas is then discharged of its own accord into the atmosphere. Consequently, even in the event of a blockade of the first discharge pipe 21 somewhere along its length, no gas is trapped in the batteries 1.

Such a fail-safe gas discharging function can be performed by all the discharge pipes 21–24. Specifically, the first and third discharge pipes 21, 23 are complemented by each other when either one of them is blocked, and the second and fourth discharge pipes 22, 24 are complemented by each other when either one of them is blocked.

Figure 6:
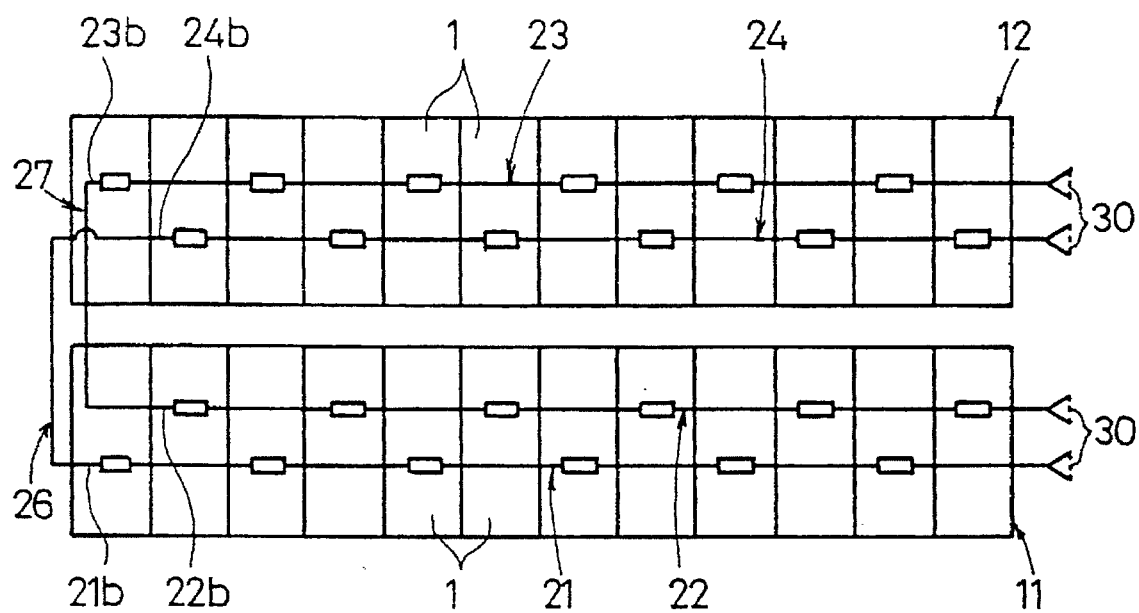
FIG. 6 is a schematic view of a modified gas discharge passage system according to the present invention.

FIG. 6 schematically shows a modified gas discharge passage system according to the present invention. The modified gas discharge passage system shown in FIG. 6 differs from the gas discharge passage system shown in FIG. 1 in that the first and fourth discharge pipes 21, 24 have respective front ends 21b, 24b interconnected by a joint pipe 26, and the second and third discharge pipes 22, 23 have respective front ends 22b, 23b interconnected by a joint pipe 27.

Figure 7:
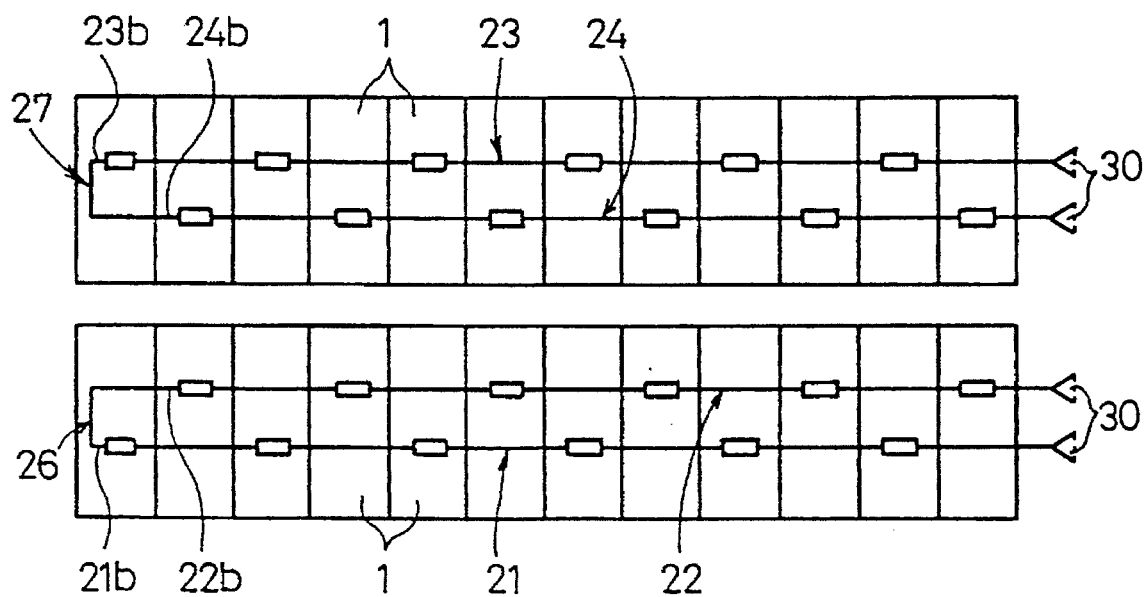
FIG. 7 is a schematic view of another modified gas discharge passage system according to the present invention.

FIG. 7 schematically illustrates another modified gas discharge passage system according to the present invention. The modified gas discharge passage system shown in FIG. 7 differs from the gas discharge passage systems shown in FIGS. 1 and 6 in that the first and second discharge pipes 21, 22 have respective front ends 21b, 22b interconnected by a joint pipe 26, and the third and fourth discharge pipes 23, 24 have respective front ends 23b, 24b interconnected by a joint pipe 27.

According to a still further modification, the front ends of three or more discharge pipes may be interconnected by a single joint pipe.

Figure 8:
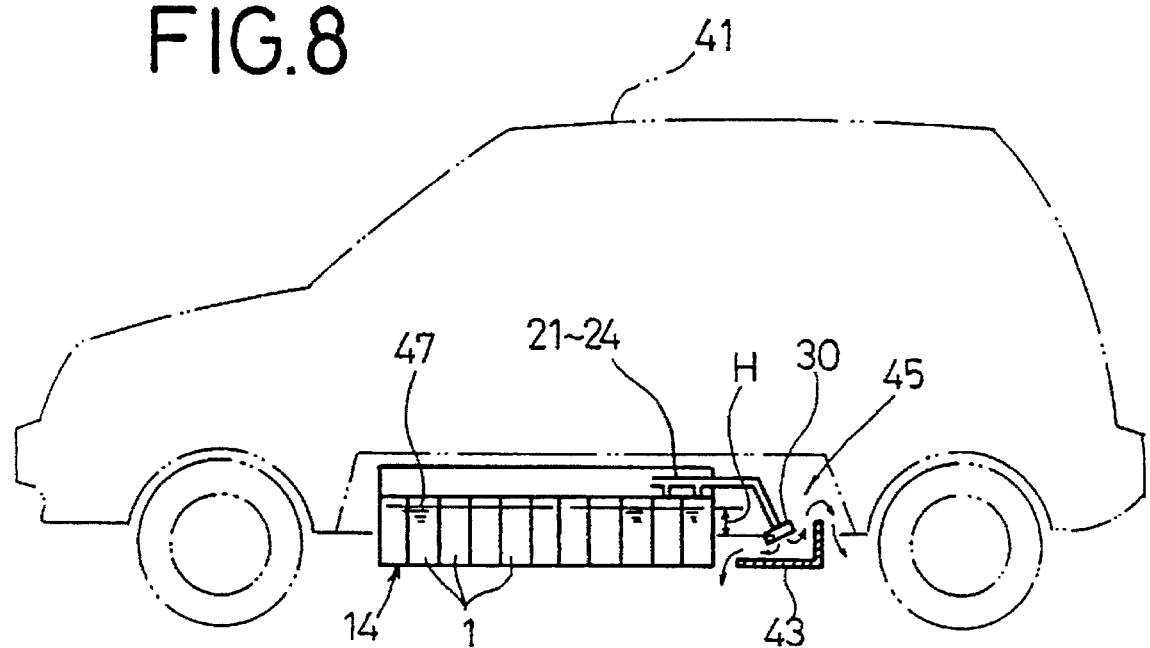
FIG. 8 is a schematic side elevational view of an electric vehicle on which the gas discharging device shown in FIG. 2 is mounted.

FIG. 8 shows in schematic side elevation an electric vehicle 41 on which the gas discharging device shown in FIG. 2 is mounted. In FIG. 8, the battery box 14 is supported under, and extends horizontally parallel to, the floor of the electric vehicle 41.

The atmospheric discharge units 30 are disposed underneath a rear portion of the electric vehicle 41, and the regions surrounding the atmospheric discharge units 30 where the gas is discharged into the atmosphere, i.e., regions located downwardly and rearwardly of the atmospheric discharge units 30, are surrounded by and covered with a shield plate 43 for preventing a fire from reaching the atmospheric discharge units 30. The electric vehicle 41 has a downwardly open space or recess 45 defined in the floor thereof and extending around, particularly upwardly of, the atmospheric discharge units 30. The space 45 is large enough to allow the gas discharged from the atmospheric discharge units 30 to be dispersed into the atmosphere at a concentration that is sufficiently low as not to cause the gas to be ignited.

The atmospheric discharge units 30 are placed in a position which is lower than a level 47 of the battery solution in each of the batteries 1 by a vertical distance H. When the atmospheric discharge units 30 are temporarily immersed in water, the discharge pipes 21–24 are filled with the gas and air, and hence the pressure in the discharge pipes 21–24 is higher than the pressure of the water, thereby preventing the water from entering the batteries 1 through the discharge pipes 21–24.

Atmospheric discharge units 30 according to other embodiments of the present invention will be described below with reference to FIGS. 9 through 15. Those parts shown in FIGS. 9 through 15 which are identical to those shown in FIG. 5 are denoted by identical reference numerals, and will not be described in detail below.

Figure 9:
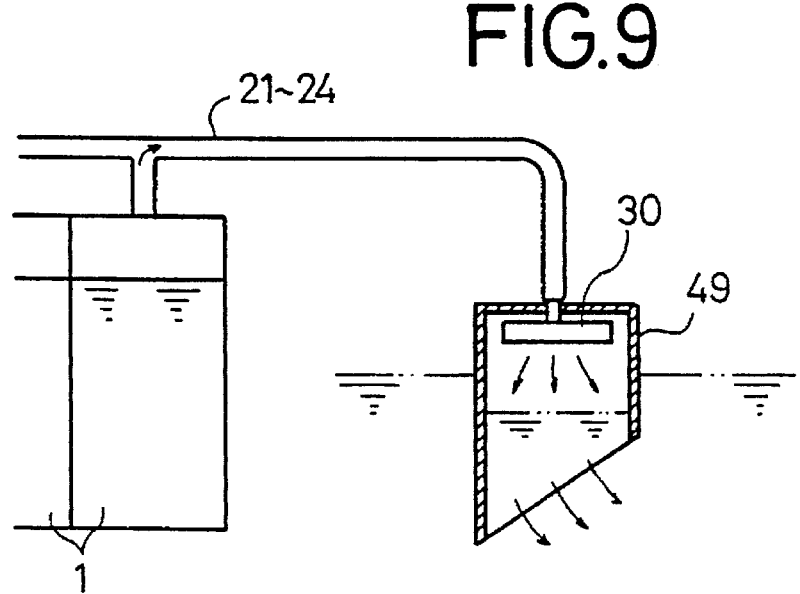
FIG. 9 is an enlarged fragmentary cross-sectional view of an atmospheric discharge unit according to a second embodiment of the present invention.

FIG. 9 shows in enlarged fragmentary cross section an atmospheric discharge unit 30 according to a second embodiment of the present invention. In FIG. 9, the atmospheric discharge unit 30, such as one of the type illustrated in FIG. 5, is surrounded by a shield cover 49.

The shield cover 49 is of a bottomed tubular shape such as a cylindrical shape or a prismatic shape having a lower end opening rearwardly and downwardly. The shield cover 49 is effective in preventing the atmospheric discharge unit 30 from being clogged by muddy particles while the electric vehicle is running and also in preventing a fire from approaching the atmospheric discharge unit 30.

When the shield cover 49 is temporarily immersed in water, the shield cover 49 is filled up with the gas from the batteries 1 and air, and hence the pressure in the shield cover 49 is higher than the pressure of the water, preventing the water from entering the batteries 1, as shown by the respective water levels shown in FIG. 9.

Figure 10:
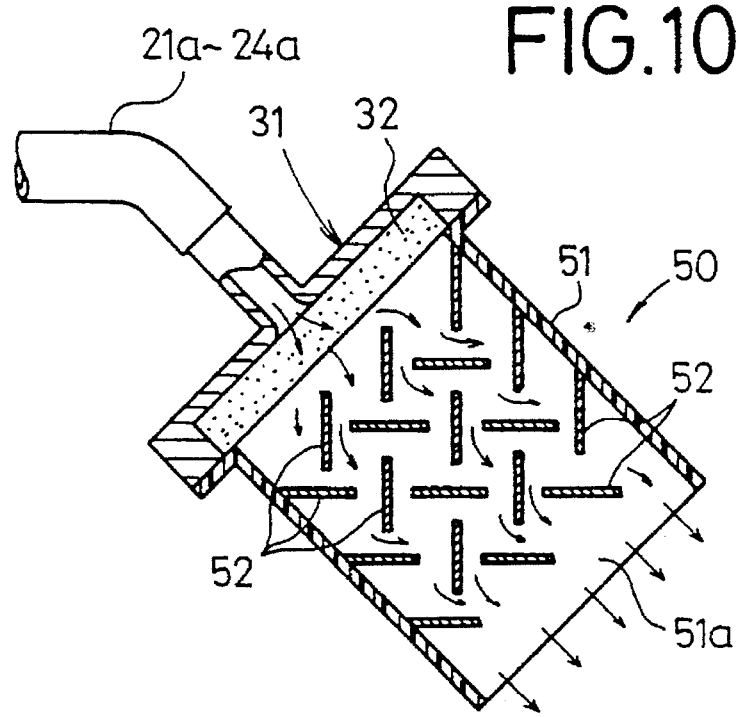
FIG. 10 is an enlarged fragmentary cross-sectional view of an atmospheric discharge unit according to a third embodiment of the present invention.

FIG. 10 shows in enlarged fragmentary cross section an atmospheric discharge unit 50 according to a third embodiment of the present invention. In FIG. 10, the atmospheric discharge unit 50 includes a case cover 51 which has a plurality of inclined baffle plates 52.

Specifically, the case cover 51 is of a cylindrical shape, and the baffle plates 52 are mounted in the cylindrical case cover 51. Adjacent baffle plates 52 are inclined at angles in opposite directions, so that the baffle plates 52 are arranged in a labyrinth. The atmospheric discharge unit 50 has a backfire check member 32 supported in a case 31. A gas supplied from the batteries 1 and ejected from the backfire check member 32 is dispersed by the baffle plates 52 as the gas flows through the cylindrical cover 51. Therefore, the gas has a substantially uniform concentration at an open end 51a of the cover 51 remote from the backfire check member 32, so that the gas will not easily be ignited when it is approached by a fire.

Figure 11:
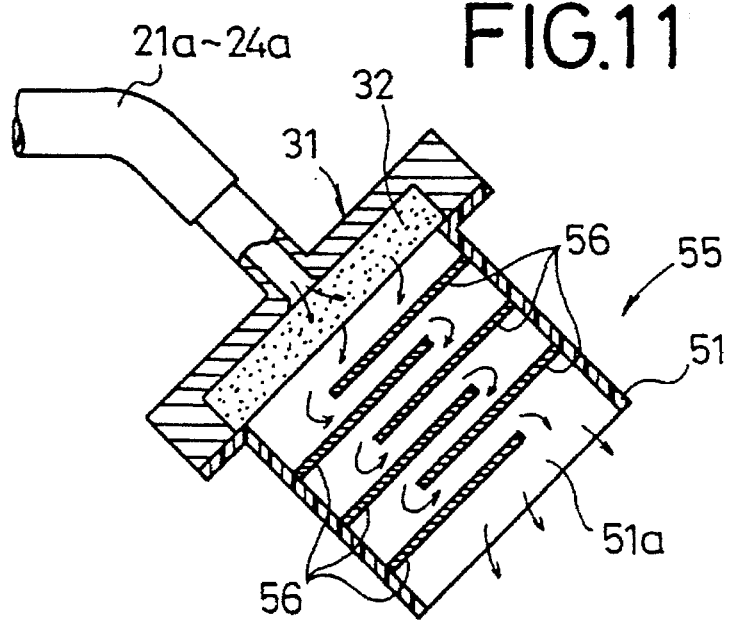
FIG. 11 is an enlarged fragmentary cross-sectional view of an atmospheric discharge unit according to a fourth embodiment of the present invention.

FIG. 11 shows in enlarged fragmentary cross section an atmospheric discharge unit 55 according to a fourth embodiment of the present invention. In FIG. 11, the atmospheric discharge unit 55 includes a cover 51 which has a plurality of parallel baffle plates 56.

Specifically, the cover 51 is of a cylindrical shape, and the baffle plates 56 are mounted in the cylindrical cover 51. The baffle plates 56 extend parallel to each other and are spaced from each other in the cylindrical cover 51. The baffle plates 56 have inner free ends that are alternately staggered in overlapping relationship in the cylindrical cover 51, so that the baffle plates 56 are arranged in a labyrinth. The atmospheric discharge unit 55 has a backfire check member 32 supported in a case 31. A gas supplied from the batteries 1 and ejected from the backfire check member 32 is dispersed by the baffle plates 56 as the gas flows through the cylindrical cover 51. Therefore, the gas has a substantially uniform concentration at an open end 51a of the cover 51 remote from the backfire check member 32, so that the gas will not easily be ignited when it is approached by a fire.

Figure 12A:
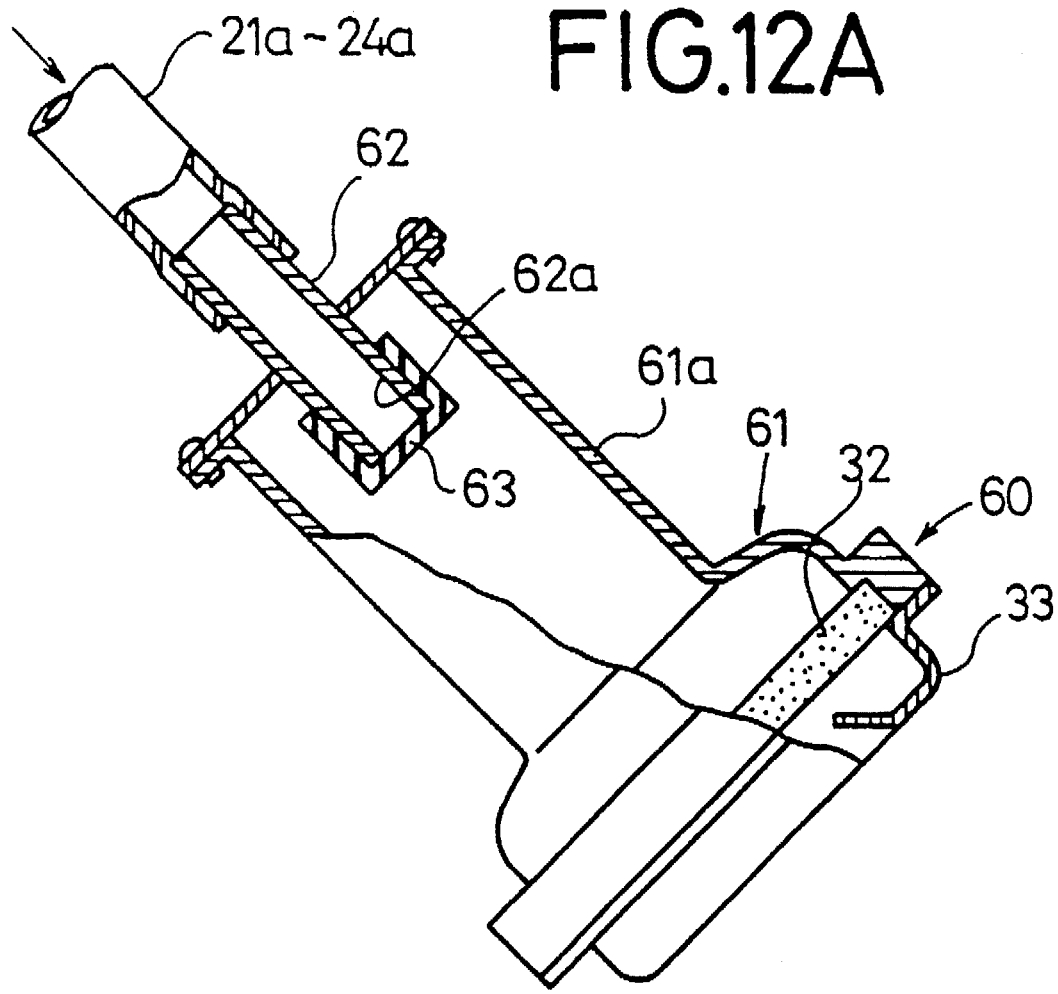
FIG. 12A is an enlarged fragmentary cross-sectional view of an atmospheric discharge unit according to a fifth embodiment of the present invention.
Figure 12B:
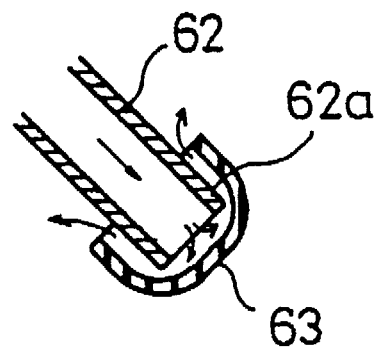
FIG. 12B is an enlarged fragmentary cross-sectional view of a gas inlet nozzle of the atmospheric discharge unit shown in FIG. 12A.

FIGS. 12A and 12B show in enlarged fragmentary cross section an atmospheric discharge unit 60 according to a fifth embodiment of the present invention. In FIGS. 12A and 12B, the atmospheric discharge unit 60 has a means for intermittently discharging a gas.

As shown in FIG. 12A, the atmospheric discharge unit 60 comprises a case 61 and a tubular member 61a extending from the case 61 which supports a gas inlet nozzle 62 at its distal end. An elastic cap 63 made of rubber or the like is mounted on an inner end 62a of the gas inlet nozzle 62 which is positioned in the tubular member 61a.

When the pressure of a generated gas in the gas inlet nozzle 62 is low, the inner end 62a is hermetically sealed by the cap 63, as shown in FIG. 12A, and no gas is discharged from the atmospheric discharge unit 60.

As the amount of a generated gas increases, the gas pressure in the gas inlet nozzle 62 also increases to elastically deform the cap 63 until the inner end 62a is opened, as shown in FIG. 12B, without discharging the cap 63 from inner end 62a. Therefore, the gas from the gas inlet nozzle 62 is discharged from the atmospheric discharge unit 60.

When the gas is discharged from the atmospheric discharge unit 60, the gas pressure in the gas inlet nozzle 62 drops, allowing the cap 63 to seal the inner end 62a again as shown in FIG. 12A.

Therefore, the cap 63 serves as a valve that operates depending on variations of the gas pressure for intermittently discharging the gas. Even if the gas discharged from the atmospheric discharge unit 60 is accidentally ignited, the flame is quickly extinguished because the atmospheric discharge unit 60 intermittently stops discharging the gas. As a result, any backfire is prevented from reaching the batteries 1.

Figure 13:
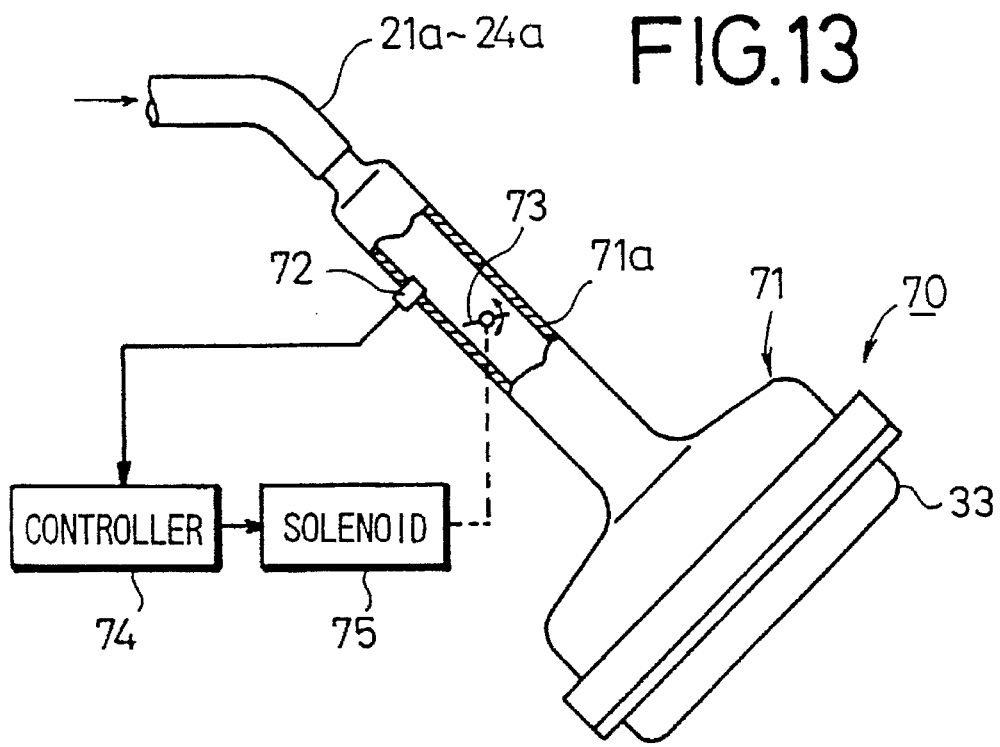
FIG. 13 is an enlarged fragmentary cross-sectional view of an atmospheric discharge unit according to a sixth embodiment of the present invention.

FIG. 13 shows in enlarged fragmentary cross section an atmospheric discharge unit 70 according to a sixth embodiment of the present invention. In FIG. 13, the atmospheric discharge unit 70 is combined with a solenoid-operated valve 73 for intermittently discharging a gas.

As shown in FIG. 13, the atmospheric discharge unit 70 includes a case 71 having a gas inlet nozzle 71a which supports a pressure sensor 72 for detecting the pressure of a gas in the gas inlet nozzle 71a. The solenoid-operated valve 73 is housed in the gas inlet nozzle 71a. The pressure sensor 72 is electrically connected to a controller 74 which is electrically connected to a solenoid 75. The solenoid 75 is mechanically connected to the solenoid-operated valve 73.

The controller 74 compares the gas pressure detected by the pressure sensor 72 with a predetermined reference pressure. If the detected gas pressure is higher than the reference pressure, then the controller 74 controls the solenoid 75 to open the solenoid-operated valve 73 for thereby discharging the gas from the atmospheric discharge unit 70. If the detected gas pressure is lower than the reference pressure, then the controller 74 controls the solenoid 75 to close the solenoid-operated valve 73. Therefore, the solenoid-operated valve 73 operates depending on variations of the gas pressure for intermittently discharging the gas. Even if the gas discharged from the atmospheric discharge unit 70 is accidentally ignited, the flame is quickly extinguished because the atmospheric discharge unit 70 subsequently stops discharging the gas by closing the valve. As a result, the atmospheric discharge unit 70 can effectively prevent any backfire from reaching the batteries 1.

Figure 14:
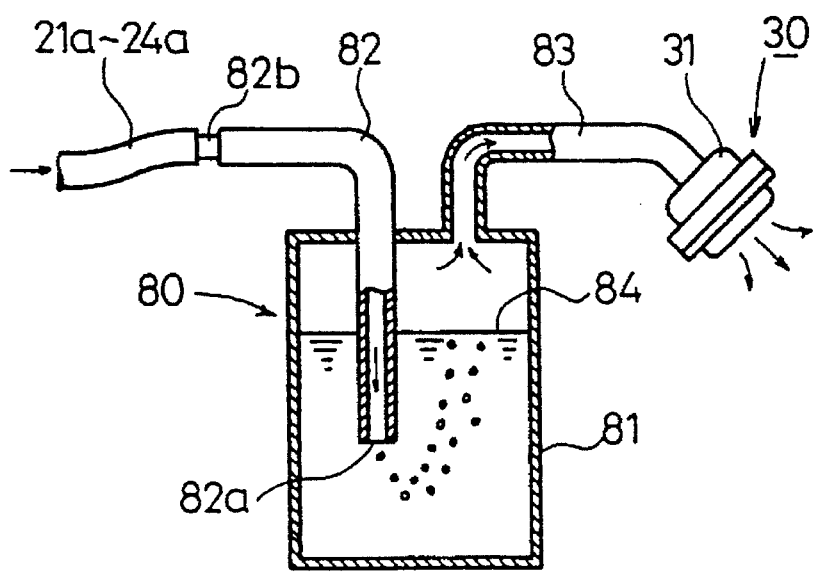
FIG. 14 is an enlarged fragmentary cross-sectional view of an atmospheric discharge unit according to a seventh embodiment of the present invention.

FIG. 14 shows in enlarged fragmentary cross section an atmospheric discharge unit 30 according to a seventh embodiment of the present invention. In FIG. 14, the atmospheric discharge unit 30 is combined with a liquid seal assembly 80 for intermittently discharging a gas.

As shown in FIG. 14, the liquid seal assembly 80 comprises a liquid seal tank 81, a gas inlet pipe 82, and a gas outlet pipe 83. A liquid 84 such as water is sealed in the liquid seal tank 81 which is closed. The gas inlet pipe 82 has a lower end 82a immersed in the liquid 84 and an upper end 82a connected to one of the rear ends 21a–24a of the respective discharge pipes 21–24. The gas outlet pipe 83 is connected to an upper panel of the liquid seal tank 81 and integrally joined to a case 31 of the atmospheric discharge unit 30, such as illustrated in FIG. 5.

A gas introduced into the gas inlet pipe 82 is injected into the liquid 84, flows through the liquid 84 and then the gas outlet pipe 83, and is discharged from the atmospheric discharge unit 30 into the atmosphere. Since the gas flows as bubbles upwardly in the liquid 84, even if the gas discharged from the atmospheric discharge unit 30 is accidentally ignited, the flame is quickly extinguished because it cannot be propagated through the liquid 84. Therefore, any backfire is prevented from reaching the batteries 1 through the atmospheric discharge unit 30 and the liquid seal assembly 80.

FIGS. 15A and 15B show in enlarged fragmentary cross section an atmospheric discharge unit 30 according to an eighth embodiment of the present invention. In FIGS. 15A and 15B, the atmospheric discharge unit 30 is combined with a check valve 90 for intermittently discharging a gas.

Specifically, the check valve 90 comprises a gas inlet pipe 91, a valve seat 92, a valve body 93, a spring 94, and a gas outlet pipe 95. The valve seat 92 is disposed between the gas inlet pipe 91 and the gas outlet pipe 95. The valve body 93 is normally urged in a direction to be seated on the valve seat 93 by the spring 94 which acts between the valve body 93 and the gas outlet pipe 95. The gas inlet pipe 91 has an end 91a connected to one of the rear ends 21a–24a of the respective discharge pipes 21–24. The gas outlet pipe 95 is integrally joined to a case 31 of the atmospheric discharge unit 30.

When the pressure of a gas in the gas inlet pipe 91 is lower than a predetermined reference pressure, the valve seat 92 is closed by the valve body 93 under the bias of the spring 94, as shown in FIG. 15A.

When the pressure of a gas in the gas inlet pipe 91 becomes higher than the reference pressure after the batteries have started being charged or discharged, the valve body 93 is unseated off the valve seat 92, allowing the gas to flow from the gas inlet pipe 91 into the gas outlet pipe 95, as shown in FIG. 15B. Therefore, the valve body 93 operates depending on variations of the gas pressure for intermittently discharging the gas. Even if the gas discharged from the atmospheric discharge unit 30 is accidentally ignited, the flame is quickly extinguished because the check valve 90 subsequently stops discharging the gas. As a result, the check valve 90 can effectively prevent any backfire from reaching the batteries 1.

According to the present invention, as described above, inasmuch as atmospheric discharge units are connected respectively to the opposite ends of a discharge pipe, a gas emitted from the batteries can be discharged from the discharge pipe even when the discharge pipe is accidentally closed somewhere along its length. Specifically, the outlet ports of a plurality of batteries are interconnected by at least two discharge pipes such that some of the outlet ports are interconnected by a first discharge pipe and the remaining outlet ports are interconnected by a second discharge pipe, and atmospheric discharge units are connected respectively to ends of the first and second discharge pipes whereas the other ends of the first and second discharge pipes are interconnected by joint pipes. Since the outlet ports of the batteries are coupled to the discharge pipes, even in the event of an accidental closure of one of the discharge pipes, a gas emitted from the batteries can be discharged from the other discharge pipe and hence prevented from being trapped in the batteries. The discharge pipes and the joint pipes which interconnect the discharge pipes are positioned lower than heads of the batteries. Therefore, when the batteries are covered with a lid, the discharge pipes and the joint pipes are protected from being flattened by the lid.

Each of the atmospheric discharge units may have a gas dispersing means for discharging a gas at a uniform concentration into the atmosphere, so that the discharged gas will not accidentally be ignited. Each of the atmospheric discharge units may have a valve for intermittently discharging a gas emitted from the batteries into the atmosphere based on the pressure of the emitted gas. Even if the discharged gas happens to be ignited, the flame can immediately be extinguished because the valve intermittently stops discharging the gas.

Although certain preferred embodiments of the present invention has been shown and described in detail, it should be understood that various changes and modifications may be made therein without departing from the scope of the appended claims.

What is claimed is:

1. A gas discharging device for discharging a gas from batteries for use on an electric vehicle, comprising:
a battery box;
a plurality of batteries housed in said battery box, said batteries having respective outlet ports for emitting a gas therefrom;
first and second discharge pipes interconnecting said outlet ports in series with each other, said first discharge pipe interconnecting the outlet ports of a first portion of said plurality of batteries in series with each other, and said second discharge pipe interconnecting the outlet ports of a second portion of said plurality of batteries in series with each other; and
atmospheric discharge units connected respectively to opposite ends of said first and second discharge pipes for discharging a gas from said first and second discharge pipes into atmosphere.

2. A gas discharging device according to claim 1, wherein each of said first discharge pipe and said second discharge pipe is composed of separate pipes, further comprising a joint pipe interconnecting the separate pipes of said first discharge pipe and the separate pipes of said second discharge pipe.

3. A gas discharging device according to claim 1, wherein said first discharge pipe interconnects the outlet ports of alternate ones of said batteries in series with each other, and said second discharge pipe interconnecting the outlet ports of remaining ones of said batteries in series with each other.

4. A gas discharging device according to claim 2, wherein each of said batteries has a pair of heads disposed on an upper surface thereof, said joint pipes being positioned lower than upper surfaces of said heads.

5. A gas discharging device according to claim 4, wherein each of said batteries has a cavity defined between the heads thereof, the discharge pipes being disposed in the cavities of the batteries.

6. A gas discharging device according to claim 1, wherein at least one of said atmospheric discharge units comprises a case connected to said discharge pipe, a case cover mounted on said case, and gas dispersing means disposed between said case and said case cover for dispersing the gas emitted by the batteries and introduced from said discharge pipe.

7. A gas discharging device according to claim 6, wherein said gas dispersing means comprises a gas dispersion chamber defined between said case and said case cover, said atmospheric discharge unit further comprising a backfire check member disposed in said gas dispersion chamber.

8. A gas discharging device according to claim 7, wherein said backfire check member is made of an inorganic porous material.

9. A gas discharging device according to claim 8, wherein said backfire check member is water-repellent.

10. A gas discharging device according to claim 6, wherein said case cover has a plurality of gas guide slats defining a plurality of gas discharge slits therebetween.

11. A gas discharging device according to claim 10, wherein said gas guide slats are tilted so as to extend horizontally with respect to the electric vehicle.

12. A gas discharging device according to claim 6, wherein said case cover has a water drain hole.

13. A gas discharging device according to claim 6, further comprising a shield member surrounding each of said atmospheric discharge units.

14. A gas discharging device according to claim 13, wherein said shield member comprises a bottomed tubular member having a lower end opening rearwardly and downwardly with respect to a forward direction in which the electric vehicle travels.

15. A gas discharging device according to claim 6, wherein the atmospheric discharge unit is positioned lower than a level of a battery solution in each of said batteries.

16. A gas discharging device according to claim 6, wherein the atmospheric discharge unit has a plurality of baffle plates disposed in said case cover.

17. A gas discharging device according to claim 16, wherein said baffle plates are arranged in a labyrinth.

18. A gas discharging device according to claim 6, wherein the atmospheric discharge unit has a gas inlet nozzle connected to said discharge pipe and extending into said case, and a cap openably and closably mounted on an end of said gas inlet nozzle in said case.

19. A gas discharging device according to claim 6, wherein the atmospheric discharge unit has a gas inlet nozzle connected to said discharge pipe and a valve openably and closably disposed in said gas inlet nozzle.

20. A gas discharging device according to claim 19, wherein said valve comprises a check valve.

21. A gas discharging device according to claim 6, further comprising a liquid seal assembly connected between each of said atmospheric discharge units and the discharge pipes.

22. A gas discharging device for discharging a gas from respective outlet ports of a plurality of batteries for use on an electric vehicle, comprising:

a discharge pipe means interconnecting said outlet ports in series with each other and having opposite ends; and an atmospheric discharge unit connected respectively to each of said opposite ends of said discharge pipe for discharging a gas from said discharge pipe into atmosphere, wherein the plurality of batteries are mounted in a row, said discharge pipe means comprising a first discharge pipe and a second discharge pipe, said first discharge pipe interconnecting the outlet ports of alternate batteries in the row in series with each other, and said second discharge pipe interconnecting the outlet ports of remaining batteries in the row in series with each other, said atmospheric discharge units connected to the ends of the first and second discharge pipes at the same end of the row of batteries.

23. A gas discharging device according to claim 22, wherein the plurality of batteries are mounted in two rows, said discharge pipe means composing two pair of a first discharge pipe and a second discharge pipe, each of said first discharge pipes interconnecting the outlet ports of alternate batteries in one said row, each of said second discharge pipes interconnecting the outlet ports of the remaining batteries in a said row, a joint pipe connecting one end of each pair of said first and second discharge pipes for forming a separate said discharge pipe means.

24. A gas discharging device according to claim 22, wherein each of said batteries has a pair of heads disposed on an upper surface thereof with a cavity defined between the pair of heads, and said discharge pipe means being disposed in the cavities of the batteries.

25. A gas discharging device according to claim 22, wherein each said atmospheric discharge unit comprises a case connected to said discharge pipe means, a case cover mounted on said case, and gas dispersing means disposed between said case and said case cover for dispersing the gas emitted by the batteries and introduced from said discharge pipe.

26. A gas discharging device according to claim 25, wherein said gas dispersing means comprises a gas dispersion chamber defined between said case and said case cover, said atmospheric discharged unit further comprising a backfire inhibiting means disposed on said gas dispersion chamber.

27. A gas discharging device according to claim 22, wherein the atmospheric discharge unit is positioned lower than a level of a battery solution in each of said batteries.

28. A gas discharging device according to claim 22, wherein the atmospheric discharge unit has a gas inlet nozzle connected to said discharge pipe means, a valve disposed in said gas inlet nozzle.

29. A gas discharging device according to claim 28, wherein said valve comprises a check valve.

30. A gas discharging device according to claim 22, further comprising a liquid seal assembly connected between each of said atmospheric discharge units and the discharge pipe means.

31. A gas discharging device for discharging a gas from batteries for use on an electric vehicle, comprising:

a battery box;

a plurality of batteries housed in said battery box, said batteries having respective outlet ports for emitting a gas therefrom;

at least one discharge pipe interconnecting said outlet ports in series with each other; and at least a pair of atmospheric discharge units connected respectively to opposite ends of said discharge pipe for discharging a gas from said discharge pipe into the atmosphere, wherein at least one of said atmospheric discharge units comprises a case connected to said discharge pipe, a case cover mounted on said case, said case cover having a plurality of gas guide slats defining a plurality of gas discharge slits therebetween, and a gas dispersing means disposed between said case and said case cover for dispersing the gas emitted by the batteries and introduced from said discharge pipe.

32. A gas discharging device for discharging a gas from batteries for use on an electric vehicle, comprising:

a battery box;

a plurality of batteries housed in said battery box, said batteries having respective outlet ports for emitting a gas therefrom;

at least one discharge pipe interconnecting said outlet ports in series with each other;

at least a pair of atmospheric discharge units connected respectively to opposite ends of said discharge pipe for discharging a gas from said discharge pipe into the atmosphere, wherein at least one of said atmospheric discharge units comprises a case connected to said discharge pipe, a case cover mounted on said case, and a gas dispersing means disposed between said case and said case cover for dispersing the gas emitted by the batteries and introduced from said discharge pipe; and a shield member surrounding each of said atmospheric discharge units.

33. A gas discharging device according to claim 31, wherein the atmospheric discharge unit has a plurality of baffle plates disposed in said case cover.

34. A gas discharging device according to claim 32, wherein the atmospheric discharge unit has a plurality of baffle plates disposed in said case cover.

35. A gas discharging device for discharging a gas from respective outlet ports of a plurality of batteries for use on an electric vehicle, comprising:

a discharge pipe means interconnecting said outlet ports in series with each other and having opposite ends; and an atmospheric discharge unit connected respectively to each of said opposite ends of said discharge pipe for discharging a gas from said discharge pipe into the atmosphere, wherein said atmospheric discharge unit is positioned lower than a level of a battery solution in each of said batteries.

36. A gas discharging device for discharging a gas from batteries for use on an electric vehicle, comprising:

a battery box;

a plurality of batteries housed in said battery box, said batteries having respective outlet ports for emitting a gas therefrom;

at least one discharge pipe interconnecting said outlet ports in series with each other; and at least a pair of atmospheric discharge units connected respectively to opposite ends of said discharge pipe for discharging a gas from said discharge pipe into the atmosphere, wherein said discharge pipe comprises first and second discharge pipes, said first discharge pipe interconnecting the outlet ports of selected batteries in series with each other, and said second discharge pipe interconnecting the outlet ports of remaining batteries in series with each other, said first discharge pipe interconnecting the outlet ports of alternate ones of said batteries in series with each other, and said second discharge pipe interconnecting the outlet ports of remaining ones of said batteries in series with each other.

37. A gas discharging device according to claim 36, wherein each of said batteries has a pair of heads disposed on an upper surface thereof, said joint pipes being positioned lower than upper surfaces of said heads.

38. A gas discharging device according to claim 37, wherein each of said batteries has a cavity defined between the heads thereof, the discharge pipes being disposed in the cavities of the batteries.

39. A gas discharging device according to claim 36, wherein at least one of said atmospheric discharge units comprises a case connected to said discharge pipe, a case cover mounted on said case, and gas dispersing means disposed between said case and said case cover for dispersing the gas emitted by the batteries and introduced from said discharge pipe.

40. A gas discharging device according to claim 39, wherein said gas dispersing means comprises a gas dispersion chamber defined between said case and said case cover, said atmospheric discharge unit further comprising a backfire check member disposed in said gas dispersion chamber.

41. A gas discharging device according to claim 40, wherein said backfire check member is made of an inorganic porous material.

42. A gas discharging device according to claim 41, wherein said backfire check member is water-repellant.

43. A gas discharging device according to claim 39, wherein said case cover has a plurality of gas guide slats defining a plurality of gas discharge slits therebetween.

44. A gas discharging device according to claim 43, wherein said gas guide slats are titled so as to extend horizontally with respect to the electric vehicle.

45. A gas discharging device according to claim 39, wherein said case cover has a water drain hole.

46. A gas discharging device according to claim 39, further comprising a shield member surrounding each of said atmospheric discharge units.

47. A gas discharging device according to claim 46, wherein said shield member comprises a bottomed tubular member having a lower end opening rearwardly and downwardly with respect to a forward direction in which the electric vehicle travels.

48. A gas discharging device according to claim 39, wherein the atmospheric discharge unit is positioned lower than a level of a battery solution in each of said batteries.

49. A gas discharging device according to claim 39, wherein the atmospheric discharge unit has a plurality of baffle plates disposed in said case cover.

50. A gas discharging device according to claim 49, wherein said baffle plates are arranged in a labyrinth.

51. A gas discharging device according to claim 39, wherein the atmospheric discharge unit has a gas inlet nozzle connected to said discharge pipe and extending into said case, and a cap openably and closably mounted on an end of said gas inlet nozzle in said case.

52. A gas discharging device according to claim 49, wherein the atmospheric discharge unit has a gas inlet nozzle connected to said discharge pipe and a valve openably and closably disposed in said gas inlet nozzle.

53. A gas discharging device according to claim 52, wherein said valve comprises a check valve.

54. A gas discharging device according to claim 39, further comprising a liquid seal assembly connected between each of said atmospheric discharge units and the discharge pipes.

* * * * *